United States Patent
Loupos et al.

(10) Patent No.: US 11,321,662 B2
(45) Date of Patent: May 3, 2022

(54) AUTHENTICATED CONTAINER ACCESS

(71) Applicant: Inlecom Group BVBA, Brussels (BE)

(72) Inventors: Konstantinos Loupos, Athens (GR); Patrick J. O'Sullivan, Dublin (IE); Antonios Mygiakis, Chalandri (GR); Gerasimos Kouloumpis, Ntrafi-Pikermi (GR); Georgia Kokona Tsiochantari, Athens (GR)

(73) Assignee: INLECOM GROUP BVBA, Brussels (BE)

( * ) Notice: Subject to any disclaimer, the term of this patent is extended or adjusted under 35 U.S.C. 154(b) by 74 days.

(21) Appl. No.: 16/896,178

(22) Filed: Jun. 8, 2020

(65) Prior Publication Data

US 2021/0383325 A1    Dec. 9, 2021

(51) Int. Cl.
| | |
|---|---|
| *G06Q 10/08* | (2012.01) |
| *H04W 4/02* | (2018.01) |
| *G08B 25/10* | (2006.01) |

(52) U.S. Cl.
CPC ....... *G06Q 10/08355* (2013.01); *G08B 25/10* (2013.01); *H04W 4/023* (2013.01)

(58) Field of Classification Search
None
See application file for complete search history.

(56) References Cited

U.S. PATENT DOCUMENTS

| | | |
|---|---|---|
| 2016/0019497 A1 | 1/2016 | Carvajal |
| 2019/0378364 A1 | 12/2019 | Drako |

FOREIGN PATENT DOCUMENTS

| | | |
|---|---|---|
| WO | WO2019161872 | 8/2019 |

*Primary Examiner* — Thomas S McCormack
(74) *Attorney, Agent, or Firm* — CRGO Global; Steven M. Greenberg

(57) ABSTRACT

An authenticated container access method includes selecting both a destination node for a shipping container positioned at a contemporaneous node and also a next node selected on a path from the contemporaneous node to the destination node. The method additionally includes writing both the next node and the destination node in an origin token along with an identification of an authorized individual enabled to access the shipping container, and then both storing the origin token in a computing device affixed to the shipping container and also transmitting the origin token to a computer at the next node. A request to access the shipping container is later received in the computing device and the token, extracted from the request. The tokens are compared and access to the shipping container permitted on condition that an identification value in the extracted token matches the identification of the authorized individual in the origin token.

15 Claims, 2 Drawing Sheets

AUTHENTICATED CONTAINER ACCESS

BACKGROUND OF THE INVENTION

Field of the Invention

The present invention relates to the field of freight transport in a supply chain and more particularly to the secured routing of freight within the supply chain.

Description of the Related Art

A supply chain is a network between a company and its suppliers to produce and distribute a specific product, and the supply chain represents the steps it takes to get the product or service to the customer. Supply chain management is a crucial process because an optimized supply chain results in lower costs and a faster production cycle. Business logistics management refers to the production and distribution process within the company, while supply chain management includes suppliers, manufacturers, logistics and transportation companies and retailers that distribute the product to the end customer. Supply chains include every business that comes in contact with a particular product, including companies that assemble and deliver parts to the manufacturer.

Part and parcel of the integrated supply chain is the effective routing of a shipping container, from an origin to a destination. Typically, a route for transporting a shipping container accounts for the shortest geographic path to the destination so as to affect the delivery of the shipping container by a requested delivery date, subject to the limitation of cost. Obviously, longer paths or longer times in transit are tolerated in exchange for a cheaper cost of transport. But, despite the very best of intentions during planning, different external factors may influence the ability of the shipping container to effectively traverse the selected route so as to meet the requested delivery date. In that instance, when possible, greater costs are incurred to re-route the shipping container along a different path using a different mode of transport so as to recover from the event giving rise to the unexpected delay. However, more often than not, increased costs are not possible and the shipping container arrives at the destination late, potentially disrupting an associated supply chain.

Much of the failings of the conventional mode of container route selection result from the inflexible and non-uniform way in which routes are selected for a container. In the end, it is a centralized scheduling entity that selects the route, a priori, negotiates the contracts necessary to secure the routing and initiates the transport of the shipping container from the point of origin to the destination. When recovery from a fault in routing is required, it is this same centralized entity that seeks to execute the recovery through a re-negotiation of existing contracts, the negotiation of new contracts and the re-initiation of transport of the shipping container from its contemporaneous position along a new route towards the destination. Recognizing this inflexibility, modern thought-leaders in the field of logistics have proposed the notion of the Physical Internet.

In supply chain logistics, the Physical Internet or "PI" is an open global logistics system founded on physical, digital, and operational interconnectivity, through encapsulation, interfaces and protocols. More than a decade ago, Professor Benoit Montreuil, a professor in the department of operations and decision systems at the Universite Laval in Quebec and a member of the College-Industry Council on Material Handling Education (CICMHE) conceived of PI as an improvement to distribution and logistics by applying some of the principles of the digital Internet to the physical movement of goods. To that end, the Physical Internet centers around the basic notion that a shipping container, as a package encapsulator, behaves like packets of the well-known Internet Protocol (IP) of the digital Internet, and moves from an origin to a destination along a route according to transport directives akin to the transport control protocol (TCP) of the digital Internet.

PI differs from traditional supply chain in many distinct ways. Yet, one principal way in which PI differs from traditional supply chain is the self-routing of a container throughout a network of prospective nodes en route from an origin to a destination. In traditional supply chain, the route of a container from origin to destination is pre-defined at the origin and enforced throughout the movement of the container from source to destination. But in PI, the container at each waypoint along the route, adapts the route according to changing conditions. That is to say, in PI unlike in traditional supply chain, there is no a priori knowledge of the route to be taken by the container. In PI, the route is determined in real time, dynamically.

Because routing is dynamic in PI, securing a container becomes much more of a challenge than in the case of traditional supply chain. In traditional supply chain, since the routing of the container is known in advance, rules may be established for each way point in the route, already known at the time of shipment, as to who may access the container, when and where. But, the same cannot be said of PI where the routing is unknown a priori. Consequently, lacking in Physical Internet is a sufficient specification of access control to a shipping container accounting for this dynamic routing.

Ironically, whereas the digital Internet, now more than ever, remains robustly equipped to manage access control and packet routing according to TCP/IP, in the Physical Internet, no such mechanism has been defined leaving the implementation of the Physical Internet less likely owing to concerns as to the security of a shipping container in transit and the ability of the shipping container to self-heal following an exigency disrupting a planned route of transport for the shipping container from origin to destination. Accordingly, what is needed is way to assure access control to a shipping container whilst the shipping container remains en route from node to node along a dynamic routing.

BRIEF SUMMARY OF THE INVENTION

Embodiments of the present invention address deficiencies of the art in respect to access control to a shipping container during the dynamic routing of the shipping container according to a Physical Internet model, and provide a novel and non-obvious method, system and computer program product for authenticated container access. In an embodiment of the invention, a method for authenticated container access includes selecting both a destination node for a shipping container positioned at a contemporaneous node and also a next node selected on a path from the contemporaneous node to the destination node. The method additionally includes writing both the next node and the destination node in an origin token along with an identification of an authorized individual enabled to access the shipping container. Optionally, the identification of the authorized individual may be a role assigned to a multiplicity of individuals.

The origin token is then stored in a computing device affixed to the shipping container. Also, the origin token is transmitted to a computer at the next node from over a computer communications network. Thereafter, a request to access the shipping container is received in the computing device and a token is then extracted from the request. Within the computing device, the origin token is compared to the extracted token. Access is then permitted to the shipping container by the computing device only on the condition that an identification value in the extracted token matches the identification of the authorized individual in the origin token. But otherwise, access to the shipping container will be denied.

In one aspect of the embodiment, a geographic location of the shipping container may be determined in response to the receipt of the request. The geographic location of the shipping container is then compared to a geographic location of the origin token. Consequently, access to the shipping container is permitted only on condition that the geographic location of the shipping container is within a threshold distance of a geographic location of the next node in the origin token. But, otherwise access is denied to the shipping container. Optionally, on the condition that the shipping container is not within a threshold distance of the geographic location of the next node of the origin token, but where the geographic location of the shipping container is determined to be within a threshold distance of a different node computed to be a valid intermediate node between the contemporaneous node and the destination node, access to the shipping container may still be permitted.

In yet another aspect of the embodiment, the method additionally includes writing a deadline in the origin token. Then, on condition that the request is received after the deadline, access to the shipping container is denied. As well, a message can be transmitted to an administrator of the shipping over the computer communications network. Finally, in even yet another aspect of the embodiment, to the extent that the identification is a role assigned to a multiplicity of individuals, access to the shipping container is permitted on condition that the identification value in the extracted token is determined to be of a role equivalent to the role of the origin token.

In another embodiment of the invention, a data processing system is configured for authenticated container access. The system includes a host computing device adapted for affixation to a shipping container. The device includes at least one processor, memory and wireless communications circuitry. The system also includes an authenticated container access module having computer program instructions that, during execution in the host computing device selects both a destination node for the shipping container when the container is positioned at a contemporaneous node, and also a next node selected on a path from the contemporaneous node to the destination node and writes both the next node and the destination node in an origin token along with an identification of an authorized individual enabled to access the shipping container.

The program instructions further store the origin token in the memory and transmit the origin token with the wireless communications circuitry to a computer at the next node from over a computer communications network. Thereafter, the program instructions receive a request to access the shipping container and extract a token from the request. The program instructions further compare the origin token to the extracted token. Finally, the program instructions permit access to the shipping container on the condition that an identification value in the extracted token matches the identification of the authorized individual in the origin token. But, otherwise the program instructions deny access to the shipping container.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for authenticated container access. In accordance with an embodiment of the invention, a shipping container positioned at a contemporaneous node may be instrumented with a computing device which receives a selection of both a destination node for the shipping container and also a next node selected on a path from the contemporaneous node to the destination node. The device writes both the next node and the destination node in an origin token along with an identification of an authorized individual enabled to access the shipping container, and then stores the origin token. The device transmits the origin token to a computer at the next node and then later, receives a request to access the shipping container. The device upon receiving the request extracts therefrom, another token and also an identity of the requestor. The device compares the extracted token to the stored token and the identity of the requestor to an identity stored in the stored token. On the condition that the tokens match and that the identities match, access to the shipping container is granted, for instance by automatically unlocking the container door, or disabling a tamper alarm. But otherwise, access to the shipping container is denied.

Figure 1:
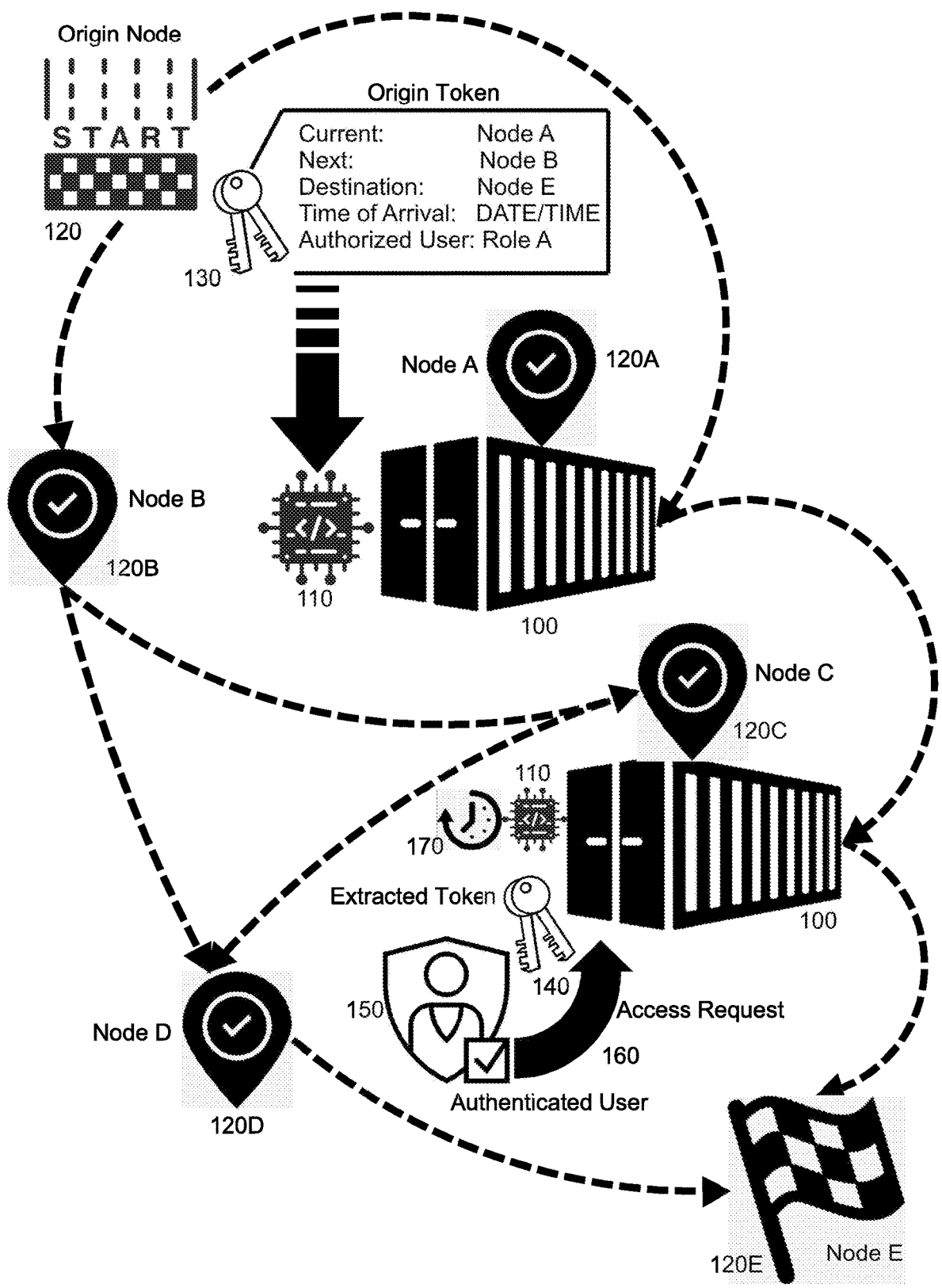
FIG. 1 is pictorial illustration of a process for authenticated container access.

In further illustration, FIG. 1 pictorially shows a process for authenticated container access. As shown in FIG. 1, shipping container 100 travels from an origin node 120 towards a destination node 120E along a route dynamically determined as the shipping container 100 arrives at each node 120A, 120B, 120C, 120D of the route. As it will be apparent, multiple sequences of the nodes 120A, 120B, 120C, 120D provide multiple different possible routes to the destination node 120E, but the selected sequence of the nodes 120A, 120B, 120C, 120D can change as the shipping container 100 arrives at each one of the nodes 120A, 120B, 120C, 120D depending upon exigent circumstances and indeed, the route is not known a priori to the shipping container 100 as a next one of the nodes 120A, 120B, 120C, 120D to which the shipping container 100 is to travel is determined as the shipping container 100 arrives at a contemporaneous one of the nodes 120A, 120B, 120C, 120D.

Of note, the shipping container 100 is instrumented with an embedded computing device 110. The embedded computing device 110 includes processor resources and global positioning system (GPS) location circuitry such that the embedded computing device 110 is enabled to dynamically compute a next one of the nodes 120A, 120B, 120C, 120D to which the shipping container 100 is to travel as the shipping container 100 arrives at a contemporaneous one of the nodes 120A, 120B, 120C, 120D. The embedded computing device 110 also stores therein an origin token 130. The origin token 130 stores an indication of the contemporaneous one of the nodes 120A, 120B, 120C, 120D, and a next computed one of the nodes 120A, 120B, 120C, 120D in the route toward the destination node 120E. Optionally, the origin token 130 stores therein a required time of arrival at the next computed one of the nodes 120A, 120B, 120C, 120D. Finally, the origin token 130 stores therein an identity of an authorized user or a role/class of an authorized user authorized to access the shipping container 100 when the shipping container 100 arrives at the next one of the nodes 120A, 120B, 120C, 120D.

Prior to the shipping container 100 arriving at the next one of the nodes 120A, 120B, 120C, 120D, the embedded computing device 110 wirelessly transmits a copy of the origin token to a computing device (not shown) at the next one of the nodes 120A, 120B, 120C, 120D. As such, when the shipping container 100 arrives at the next one of the nodes 120A, 120B, 120C, 120D, an end user 150 seeking access to the shipping container 100 can present an access request 160 to the embedded computing device 110 including an identity of the end user 150 and a copy 140 of the token 130. In this regard, the end user 150 can provide the request 160 to the embedded computing device 110 by way of short range wireless communications such as Bluetooth™ or near field communications (NFC), by way of electronic mail or text message at an address or number associated with the embedded computing system 110, to name a few examples.

The embedded computing device 110 can then compare the copy 140 to the origin token 130 to determine if the tokens 130, 140 are identical. As well, the embedded computing device 110 can compare the identity of the end user 150 to a permissible identity or role stored in the origin token 130 so as to determine if the end user 150 is an authenticated individual permitted to access the shipping container 100. If so, the embedded computing device 110 can de-activate a tamper alarm within the shipping container 100 and electronically de-activate a lock sealing a door to the shipping container 100. Optionally, a time stamp 170 can be compared to a time of arrival specified in the origin token 130 and, to the extent that the time stamp 170 is beyond the time of arrival, a message can be transmitted to a prespecified administrative address indicating a current location and time of arrival of the shipping container 100 at the contemporaneous one of the nodes 120A, 120B, 120C, 120D.

As another option, upon the shipping container 100 arriving at the contemporaneous one of the nodes 120A, 120B, 120C, 120D, GPS circuitry of the embedded computing device 110 determines a location of the shipping container 100 and whether or not the shipping container 100 is within a threshold distance of the next one of the nodes 120A, 120B, 120C, 120D set forth in the origin token 130. If so, the embedded computing device 110 can conclude that the shipping container 100 had arrived at the next one of the nodes 120A, 120B, 120C, 120D as planned. But, in the event that the shipping container 100 determines from the location that the shipping container 100 is not within a threshold distance of the next one of the nodes 120A, 120B, 120C, 120D, the embedded computing device 110 determines from the location if the shipping container 100 is within a threshold distance of an alternate one of the nodes 120A, 120B, 120C, 120D and, if so, if the alternate one of the nodes 120A, 120B, 120C 120D provides for a viable route to the destination node 120E within the time constraints specified in the origin token 130. If so, while a message can be transmitted to the pre-specified administrative address indicating a deviation in routing, no alert is required as to a fault condition. But, otherwise, the embedded computing device 110 secures the lock on the door of the shipping container and messages an alert to the pre-specified administrative address.

Figure 2:
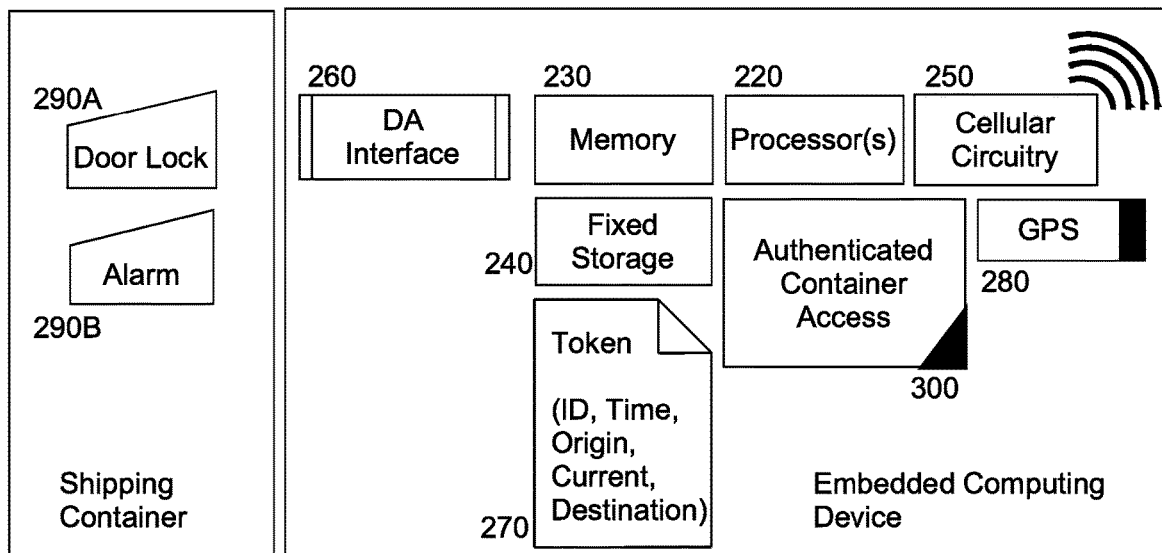
FIG. 2 is a schematic illustration of a data processing system adapted for authenticated container access; and, FIG. 3 is a flow chart illustrating a process for authenticated container access.

The process described in connection with FIG. 1 may be implemented within a computer data processing system. In further illustration, FIG. 2 schematically shows a data processing system adapted for authenticated container access. The system includes an embedded computing device 200 affixed to a shipping container 210. The embedded computing device 200 includes one or more processors 220, memory 230 and fixed storage 240. The embedded computing device 200 also includes cellular telephony circuitry 250 permitting wireless data communications, a digital to analog interface 260 permitting the control by the one or more processors of analog devices positioned on the shipping container 210 such as a door lock 290A or alarm 290B. The embedded computing device 200 additionally includes GPS circuitry 280. Finally, the embedded computing device 200 includes an authenticated container access module 300.

The authenticated container access module 300 includes computer program instructions that, when executing by the one or more processors 220, are enabled to receive a request to access the shipping container 210, to extract from the request, a token and an identifier of the requestor and to compare the extracted token to a token 270 stored in the fixed storage 240. To the extent that the token 270 compares to the extracted token and the identifier refers to an end user permitted to access the shipping container 210 as set forth in the token 270, the program instructions de-activate the door lock 290A and disarm the alarm 290B in the shipping container 210. Optionally, the program instructions further validate a current location of the container 210 by way of the GPS circuitry 280 in comparison to an expected location set forth in the token 270. To the extent that the current location differs from the expected location, the program instructions activate the door lock 290A. As yet another option, a current date and time can be compared by the program instructions to a specified date and time in the token 270 and to the extent that the current date and time exceed the specified date and time by a threshold margin, the program instructions activate the door lock 290A.

Figure 3:
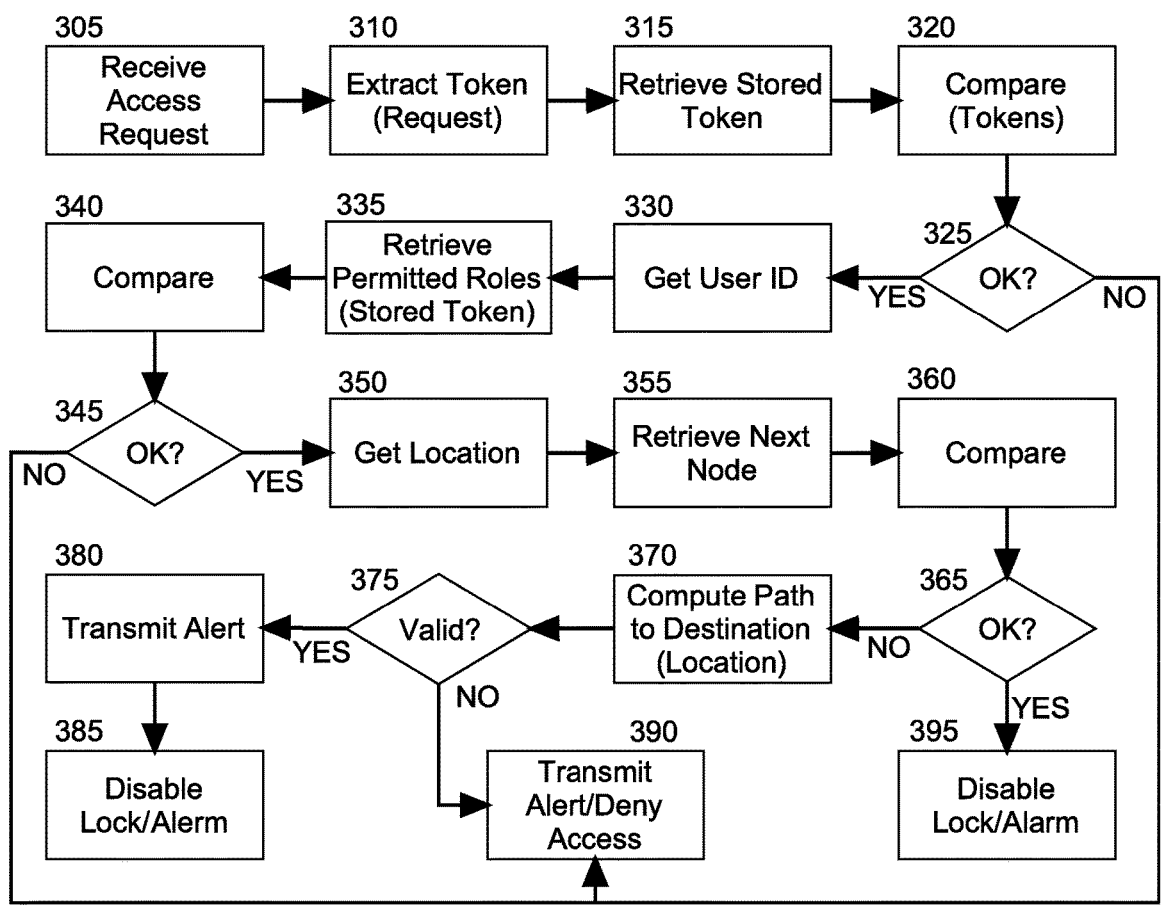

In even yet further illustration of the operation of the authenticated container access module 300, FIG. 3 is a flow chart illustrating a process for authenticated container access. Beginning in block 305, an access request is received in an embedded computing device for a shipping container. In block 310, a token is extracted from the request and in block 315, a stored token retrieved from persistent memory of the embedded computing device. In block 320, the tokens are compared and in decision block 325, if the tokens are determined to be equivalent, a user identifier is retrieved from the request as are a list of one or more permitted identifiers or permitted roles of individuals authorized to access the shipping container. In block 340, the user identifier is compared to the list of one or more permitted identifiers or permitted roles in order to determine in decision block 345 if the requestor is authorized to access the container. If not, the process continues to block 390 with a denial of access to the container and the transmission of an alert to an administrator. But otherwise, the process continues through block 350.

In block 350, a contemporaneous location of the shipping container is determined based upon GPS data received in the embedded computing device and in block 355, an expected next node specified in the stored token is retrieved. In block 360 the contemporaneous location is compared to a location of the expected next node and in decision block 365 if it is determined that the contemporaneous location is consistent with the location of the expected next node, a lock on a door to the shipping container is deactivated and an alarm disarmed. But, in decision block 365 if it is determined that the contemporaneous location is inconsistent with the location of the expected next node, in block 370 an alternate path to the destination node set forth in the token from a different node associated with the contemporaneous location is computed.

In decision block 375, if the computed path is valid in so far as the number of nodes is below a threshold value, or an estimated time of arrival at the destination node is before the time of arrival set forth in the token, or the cost of transport along the alternate path is below a threshold cost, then in block 380 an alert with the alternative route is transmitted to the administrative end user and in block 385 the door to the shipping container is deactivated and the alarm disabled. But otherwise, the door lock is activated and an alert message is transmitted to the administrative end user in block 390. In this way, the content of the shipping container may be secured until such time as the shipping container can be recovered by the administrative end user.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for authenticated container access comprising:
   selecting both a destination node for a shipping container positioned at a contemporaneous node and also a next node selected on a path from the contemporaneous node to the destination node;
   writing both the next node and the destination node in an origin token along with an identification of an authorized individual enabled to access the shipping container;
   storing the origin token in a computing device affixed to the shipping container and transmitting the origin token to a computer at the next node from over a computer communications network;
   receiving a request in the computing device to access the shipping container and extracting a token from the request;
   comparing in the computing device the origin token to the extracted token; and,
   permitting access to the shipping container by the computing device on condition that an identification value in the extracted token matches the identification of the authorized individual in the origin token, but otherwise denying access to the shipping container.

2. The method of claim 1, wherein the identification of the authorized individual is a role assigned to a multiplicity of individuals such that access to the shipping container is permitted on condition that the identification value in the extracted token is determined to be of a role equivalent to the role of the origin token.

3. The method of claim 1, further comprising:
   determining a geographic location of the shipping container in response to the receipt of the request;
   comparing the geographic location of the shipping container to a geographic location of the origin token; and,
   permitting access to the shipping container on condition that the geographic location of the shipping container is within a threshold distance of a geographic location of the next node in the origin token, but otherwise denying access to the shipping container.

4. The method of claim 1, wherein, on the condition that the shipping container is not within a threshold distance of the geographic location of the next node of the origin token, but where the geographic location of the shipping container is determined to be within a threshold distance of a different node computed to be a valid intermediate node between the contemporaneous node and the destination node, permitting access to the shipping container.

5. The method of claim 1, further comprising writing a deadline in the origin token and, on condition that the request is received after the deadline, denying access to the shipping container and transmitting a message to an administrator of the shipping over the computer communications network.

6. A data processing system configured for authenticated container access, the system comprising:
   a host computing device adapted for affixation to a shipping container, the device comprising at least one processor, memory and wireless communications circuitry; and,
   an authenticated container access module comprising computer program instructions that, during execution in the host computing device perform:
   selecting both a destination node for the shipping container when the container is positioned at a contemporaneous node, and also a next node selected on a path from the contemporaneous node to the destination node;
   writing both the next node and the destination node in an origin token along with an identification of an authorized individual enabled to access the shipping container;
   storing the origin token in the memory and transmitting the origin token with the wireless communications circuitry to a computer at the next node from over a computer communications network;
   receiving a request to access the shipping container and extracting a token from the request;
   comparing the origin token to the extracted token; and,
   permitting access to the shipping container on condition that an identification value in the extracted token matches the identification of the authorized individual in the origin token, but otherwise denying access to the shipping container.

7. The system of claim 6, wherein the identification of the authorized individual is a role assigned to a multiplicity of individuals such that access to the shipping container is permitted on condition that the identification value in the extracted token is determined to be of a role equivalent to the role of the origin token.

8. The system of claim 6, wherein the program instructions further perform:
   determining a geographic location of the shipping container in response to the receipt of the request;
   comparing the geographic location of the shipping container to a geographic location of the origin token; and,
   permitting access to the shipping container on condition that the geographic location of the shipping container is within a threshold distance of a geographic location of the next node in the origin token, but otherwise denying access to the shipping container.

9. The system of claim 6, wherein, on the condition that the shipping container is not within a threshold distance of the geographic location of the next node of the origin token, but where the geographic location of the shipping container is determined to be within a threshold distance of a different node computed to be a valid intermediate node between the contemporaneous node and the destination node, permitting access to the shipping container.

10. The system of claim 6, wherein the program instructions further perform writing a deadline in the origin token and, on condition that the request is received after the deadline, denying access to the shipping container and transmitting a message to an administrator of the shipping over the computer communications network.

11. A computer program product for authenticated container access, the computer program product including a non-transitory computer readable storage medium having program instructions embodied therewith, the program instructions executable by a device to cause the device to perform a method including:

selecting both a destination node for a shipping container positioned at a contemporaneous node and also a next node selected on a path from the contemporaneous node to the destination node;

writing both the next node and the destination node in an origin token along with an identification of an authorized individual enabled to access the shipping container;

storing the origin token in a computing device affixed to the shipping container and transmitting the origin token to a computer at the next node from over a computer communications network;

receiving a request in the computing device to access the shipping container and extracting a token from the request;

comparing in the computing device the origin token to the extracted token; and, permitting access to the shipping container by the computing device on condition that an identification value in the extracted token matches the identification of the authorized individual in the origin token, but otherwise denying access to the shipping container.

12. The computer program instructions of claim 11, wherein the identification of the authorized individual is a role assigned to a multiplicity of individuals such that access to the shipping container is permitted on condition that the identification value in the extracted token is determined to be of a role equivalent to the role of the origin token.

13. The computer program instructions of claim 11, wherein the method further comprises:

determining a geographic location of the shipping container in response to the receipt of the request;

comparing the geographic location of the shipping container to a geographic location of the origin token; and, permitting access to the shipping container on condition that the geographic location of the shipping container is within a threshold distance of a geographic location of the next node in the origin token, but otherwise denying access to the shipping container.

14. The computer program instructions of claim 11, wherein, on the condition that the shipping container is not within a threshold distance of the geographic location of the next node of the origin token, but where the geographic location of the shipping container is determined to be within a threshold distance of a different node computed to be a valid intermediate node between the contemporaneous node and the destination node, permitting access to the shipping container.

15. The computer program instructions of claim 11, wherein the method further includes writing a deadline in the origin token and, on condition that the request is received after the deadline, denying access to the shipping container and transmitting a message to an administrator of the shipping over the computer communications network.

* * * * *